Dec. 30, 1969  W. H. ZUERCHER  3,486,602
TRANSFER SYSTEM OVERDROP WITH LUMBER RETARDER
Filed May 26, 1966  3 Sheets-Sheet 1
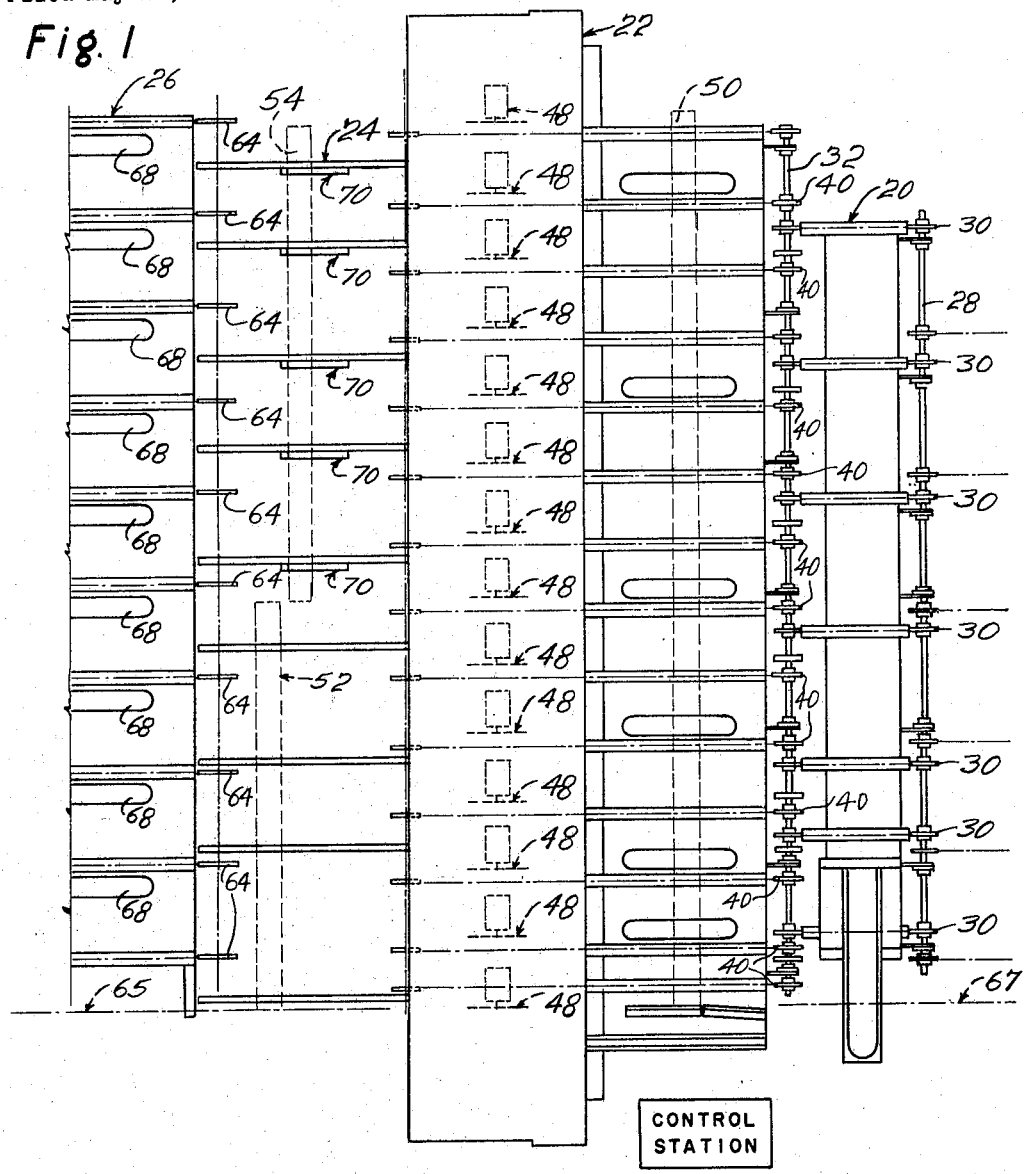
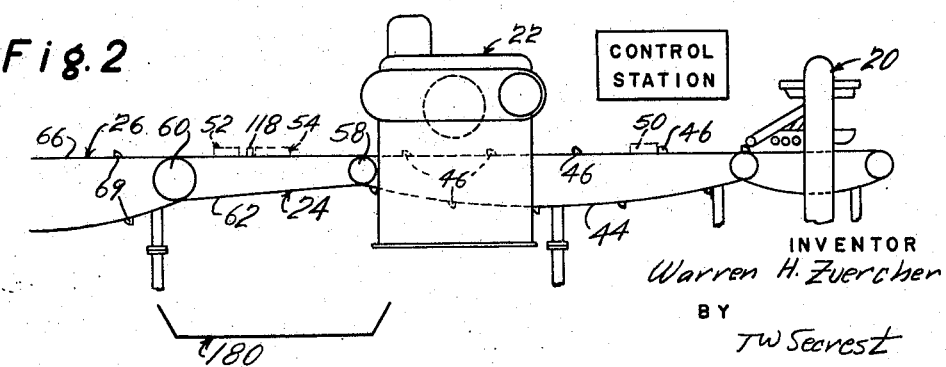
INVENTOR
Warren H. Zuercher
BY
TW Secrest
ATTORNEY

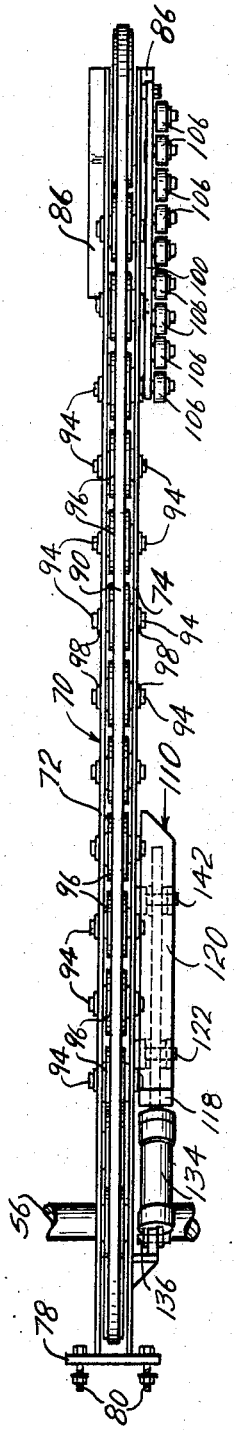

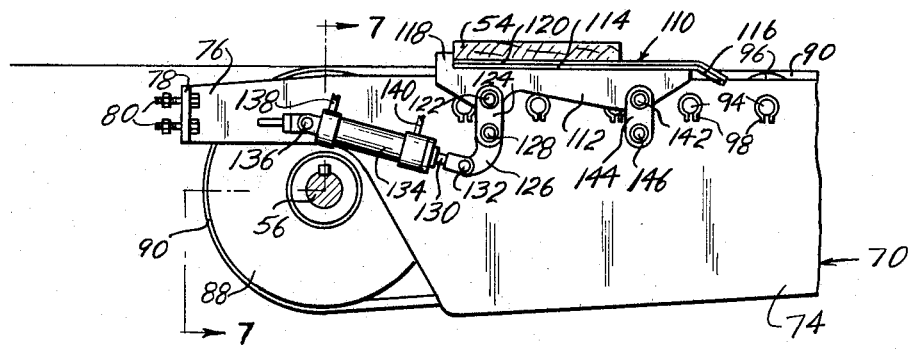
Fig. 5
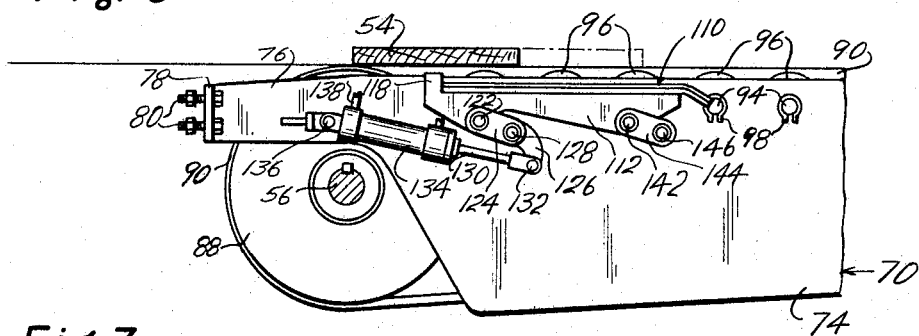
Fig. 6
Fig. 7
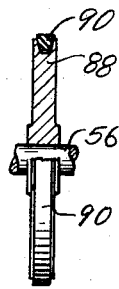
Fig. 8
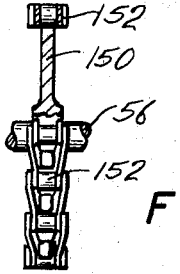
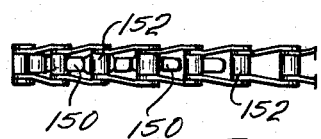
Fig. 9
Fig. 10
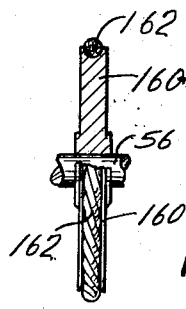
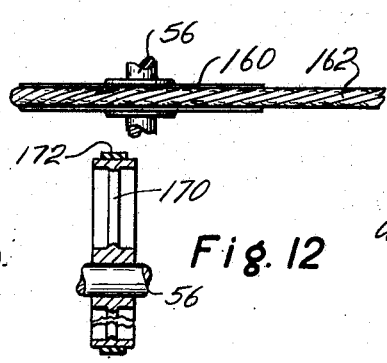
Fig. 11
Fig. 12
INVENTOR
Warren H. Zuercher
BY
VW Secrest
ATTORNEY

United States Patent Office 3,486,602
Patented Dec. 30, 1969

3,486,602
TRANSFER SYSTEM OVERDROP WITH LUMBER RETARDER
Warren H. Zuercher, Seattle, Wash., assignor to Stetson-Ross Machine Company, Inc., Seattle, Wash., a corporation of Washington
Filed May 26, 1966, Ser. No. 553,206
Int. Cl. B65g 47/31
U.S. Cl. 198—30                                                  2 Claims This invention is directed to a lumber retarder for selectively retarding the flow of individual pieces of lumber from a first conveyor to a second conveyor.

One of the places this lumber conveyor may be used is in the retarding lumber flowing from a sawmill or planning mill trimmer. In FIGURES 1 and 2 there is diagrammatically presented a combination of a feeder 20, a trimmer 22, a retarder 24, and an ending table or conveyor 26. The feeder 20 has an inlet or a first shaft or a tail shaft 28 and on which shaft 28 there are sprockets 30. Also, the feeder 20 has an outlet or a second shaft or a head shaft 32 and on which shaft there are sprockets 34. A chain 36 runs around the sprocket 30 and 34. It is seen that there are a plurality of endless chains 36.

The trimmer 22 is positioned adjacent the feeder 20 so as to receive the flow of lumber from the feeder 20 and comprises the inlet shaft 32 and the outlet shaft 38. On the shaft 32 there are sprockets 40 and on the shaft 38 there are sprockets 42. An endless chain 44 runs around the sprockets 40 and 42. On the chain 44 there are lugs 46 for moving lumber. The trimmer 22 has saws 48 which may be lowered as desired to cut the lumber into desired lengths. The saws may trim the ends of the lumber or may cut a piece of lumber out of the middle. That portion of the trimmer 22 near the inlet shaft 32 and the sprockets 40 may be considered to be an inlet conveyor to the trimmer and that portion of the trimmer near the outlet shaft 38 and the outlet sprockets 42 may be considered to be the outlet conveyor of the trimmer. It is seen that the lugs 46 push a piece of lumber 50 towards the trimmer saws 48. Also, it is seen that there are a plurality of trimmer saws 48. The pieces of lumber 50 may have one of many lengths ranging from approximately eight feet to 26 or 30 feet depending upon the size of the apparatus.

A piece of lumber 50 may be an entire good piece of lumber, or the piece of lumber 50 may have a high grade portion and may have a low grade portion. For example, the piece of lumber 50 may be 20 feet in length and may have ten feet of clear lumber which may be graded number one and may have ten feet of lumber having knots which may be graded number 2 or number 3. If the piece of lumber 50 is maintained at its original length of 20 feet, then the entire piece of lumber is graded number two or number three. Therefore, in order to increase the economic value, the piece of lumber is divided into two pieces ten feet in length, of which one is graded number one and the other one is graded number two or number three. After the piece of lumber 50 has been divided into two pieces of ten feet in length, these two pieces, 52 and 54, leave the trimmer 22 simultaneously. At this time and place it is necessary to selectively separate these two pieces so that only one piece flows off the retarder 24 at one time.

The retarder 24 comprises the inlet shaft 38 or the head shaft 38 of the trimmer 22 and the tail shaft 56 of the conveyor 26 or the outlet shaft 56 of the retarder 24. On the shafts 38 and 56 there are pulleys 58 and 60. An inlet belt 62 runs around the pulleys 58 and 60. There is a retarding mechanism on the retarder 24, and which will be more fully described, for retarding the flow of lumber, and, in particular, see FIGURES 1 and 2, the flow of a piece of lumber 54. The outlet shaft 56 of retarder 24 or the inlet shaft 56 of the conveyor 26 leads or is positioned next to the conveyor 26. On the shaft 56 there are sprockets 64. There are endless chains 66 running around the sprockets 64. Also, on the conveyor 26 there are power driven rollers 68 which move the pieces of lumber 52 and 54, as shown in FIGURE 1, towards either side of the grading table 26. Generally, the piece of lumber which is retarded, i.e., 54, is moved farther than the piece of lumber which is not retarded, i.e., 52. In this instance the piece of lumber 54 moves towards the outgoing lumber line 65. With respect to the feeder 20 and the trimmer 22 there is an incoming lumber line 67. With respect to the trimmer 22 and the retarder 24 there is an outgoing lumber line 65. It is desirable to move all pieces of the lumber to the outgoing lumber line. If the lumber is not cut then it is already at the outgoing lumber line. Further, the lumber can readily be pulled at the outgoing lumber line; grade marks applied; and, end marking performed. From this action it is seen that only one piece of lumber at a time should leave the retarder 24 and be deposited on the ending table 26. Therefore, since the piece of lumber 50 has been divided into two pieces of lumber 52 and 54, it is necessary to retard one of these two pieces of lumber. The piece of lumber 52 is near the outgoing lumber line of the retarder 24 and therefore will be near the outgoing lumber line of the conveyor 26. Therefore, it is logical to retard the piece of lumber 54 which is farther away from the outgoing lumber line so that the piece of lumber 54 will not bump or be moved into conflict with the piece of lumber 52. This is readily apparent when one considers that the rollers 68 on the grading table 26 move the lumber towards the outgoing lumber line. If these two pieces of lumber 52 and 54 left retarder simultaneously, then the piece of lumber 54 would bump into the piece of lumber 52 and damage the piece of lumber 52 as well as damaging the piece of lumber 54. The lumber retarder may be considered to be a selector for conveying lumber as it discharges only one piece of lumber at a time onto the next conveyor.

From this description, it is seen that the trimmer 22 is positioned adjacent the feeder 20 and takes the lumber from the feeder 20. The lugs 46 on the inlet chain 44 move the piece of lumber 50 toward the trimmer saws. Then, the piece of lumber or pieces of lumber from the trimmer 22 flow onto the retarder 24. The pieces of lumber 52 and 54 flow off the retarder 24 onto the conveyor 26. The conveyor 26 and the retarder 24 are positioned adjacent each other so that the conveyor 26 readily accepts the lumber from the retarder 24.

It is seen that the lumber 50 and the pieces of lumber 52 and 54 are transversely positioned with respect to the direction of flow of the lumber through the feeder 20, the trimmer 22, the retarder 24, and the conveyor 26.

Prior to this invention, lumber retarders used chains and lugs to move the lumber. In the retarding of the movement of lumber, the lifting mechanism had to lift the lumber above a lug. The lifting mechanism would rapidly rise and hit the lumber so as to elevate it. Sometimes, the lumber would be knocked around on the retarder and once in a while knocked off the retarder. Further, by such violent action, the lumber was often damaged and marked.

With this background of the position of the lumber retarder in the manufacture of lumber, it is an object of this invention to provide a lumber retarder which selectively places a board in sequence in the flow of lumber; a lumber retarder which provides faster operation than previously available lumber retarders; a lumber retarder which handles the lumber in an easier manner than previously available lumber retarders and does not mark the lumber; a lumber retarder providing skate wheels for assisting in the flow of lumber onto the lumber retarder; a lumber retarder having a higher output than previously available lumber retarders; a lumber retarder which is less expensive to build than previously available lumber retarders; a lumber retarder having fewer moving parts than previously available lumber retarders; and, a lumber retarder requiring less maintenance than previously available lumber retarders.

These and other important objects and advantages of the invention will be more particularly brought forth upon reference to the accompanying drawings, the detailed description of the invention; and the appended claims.

In the drawings:

FIGURE 1 is a plan view of a diagrammatic representation of a feeder for feeding lumber to a trimmer and a retarder for taking the lumber from the trimmer and retarding a piece of lumber and an ending table for taking the lumber from the retarder;

FIGURE 2 is a diagrammatic elevational view of FIGURE 1 and illustrates the feeder, trimmer, retarder and ending table;

FIGURE 3 is a plan view looking down on one lumber retarder;

FIGURE 4 is a side elevational view looking at the lumber retarder and illustrates the retarding mechanism for retarding the flow of lumber;

FIGURE 5, on an enlarged scale, is a fragmentary view of the lumber retarder and illustrates the lumber mechanism in a raised or elevated position for retarding the flow of one piece of lumber;

FIGURE 6 is a fragmentary side elevational view of the lumber retarder and illustrates the retarder mechanism in a lowered or depressed state so as to allow a piece of lumber to pass over the retarding mechanism;

FIGURE 7 is a vertical lateral cross-sectional view taken on line 7—7 of FIGURE 5 and illustrates the pulley and the belt for moving lumber on the lumber retarder;

FIGURE 8 is a view similar to FIGURE 7 but illustrates a sprocket and chain for moving lumber on the lumber retarder;

FIGURE 9 is a view looking down on the sprocket and chain and illustrates a lug on the chain for moving lumber on the lumber retarder;

FIGURE 10 is a view similar to FIGURES 7 and 8 and illustrates a pulley and rope for moving lumber on the lumber retarder;

FIGURE 11 is a plan view looking down on the pulley and rope and illustrates the rope passing over the pulley for use in moving lumber on the lumber retarder.

FIGURE 12 is a view similar to FIGURES 7, 8 and 10 and illustrates a pulley and a flat belt for moving lumber on the lumber retarder.

In FIGURES 3 and 4 there is illustrated an individual lumber retarder 70. It is seen that there are two spaced-apart frame members 72 and 74. The frame members 72 and 74 on the forward part have an outwardly directed member or finger 76. These two frame members are joined or united by a connecting plate 78. In FIGURE 3 it is seen that the two frame members 72 and 74 and the connecting plate 78 form a T. The connecting plate 78 is welded to the frame members 72 and 74. In the connecting plate 78 are numerous passageways through which bolts 80 pass so as to connect 78 to a support.

At the rear of the frame members 72 and 74 there is a recess 82. In each recess 82 of frames 72 and 74 there is a bearing 84. Also, on the outside of the plates 72 and 74 there is a stiffener plate 86. In the bearings 84 there is mounted the inlet shaft 38. The shaft 38 may be the head shaft of the trimmer 22 or may be the head shaft of a conveyor which is on the front of the trimmer 22 for removing lumber from the trimmer 22.

Underneath the leg 76 and in front of the plates 72 and 74 there is a shaft 56. The shaft 56 may be the tail shaft of the conveyor 26 or ending table 26 or may be the tail shaft of another conveyor or may be independently supported. On the shaft 38 there are mounted pulleys 87 and on the shaft 56 there are mounted pulleys 88. The pulleys 87 and 88 are V type pulleys for receiving a V-belt 90.

In the plates 72 and 74 and near the upper edge there are passageways 92 and in these passageways 92 there are shafts 94 for supporting carrier pulleys 96. The shafts 94 are locked in the passageways 92 by retainer ring 98. As is readily appreciated the pulleys 96 carry the V-belt 90.

Near the right hand or entrance to the lumber retarder 70, see FIGURES 3 and 4, there is a mounting bar 100. This mounting bar 100 is attached to the plate 74 by means of bolts 102. It is seen that the upper edge 104 slopes downwardly as the mounting bar progresses towards the middle portion of the plate 74. Also, there are mounted on the mounting bar a number of skate wheels 106. It is seen that the upper surface of the skate wheels 106 near the entrance of the lumber retarder 107, viz., positioned above the bearing 84, are above the upper surface of the V-belt 90, and as the skate wheels progress toward the center of the mounting bar 74 that the upper surface of these skate wheels is below the upper surface of the V-belt 90. The reason for this is that when the lumber progresses onto the lumber retarder 70 from the conveyor preceding the lumber retarder 70 that the lumber flows more readily on the skate wheels than on previously used equipment. The conveyor which feeds lumber onto the lumber retarder 24 comprises chains and lugs. The lugs mark the trailing edge of the lumber being discharged from the conveyor onto the retarder. With the use of the skate wheels, the transfer of the lumber from the conveyor is more readily transferred as the lugs contact the trailing edge of the lumber and push it onto the skate wheels. With this arrangement I have found that the trailing edge of the lumber is not marked.

There is a lifting mechanism 110 comprising a lift arm 112 having a substantially flat bearing surface 114. At the rear of the bearing surface 114 and connecting therewith is an inclined surface 116 and at the front portion of the bearing surface 114 there is an upwardly directed lug 118. On the top of the surfaces 114 and 116 there is a protective covering 120, such as rubber or a plastic so that the wood will not be scarred upon contacting the lifting mechanism 110.

Near the forward part of the lift arm 112 there is a shaft 122. A first link 124 connects with the shaft 122. The first link 124 connects with a lever 126 by means of a shaft or pin 128. The lever 126 connects with a plunger 130 by means of a pin or shaft 132. The plunger 130 is part of the fluid actuated cylinder 134. One end of the fluid actuated cylinder 134 is pivoted by pin 136 to the leg 76 of the plate 74. There are inlet pipes or tubes 138 to the fluid actuated cylinder 134.

Near the rear of the lift arm 112 there is a pin 142. A second link 144 connects with the lift arm 112 by means of the pin 142. The second link 144 connects with the plate 74 by means of a pin 146.

In FIGURE 5 it is seen that the plunger 130 is retracted so that the lever 126 is rotated and the link 124 is rotated to be in an upright position. Actually, in regard to the rest position or lowered position of the retarding mechanism 110 by retracting the lever 130, the lever 126 and link 124 rotate in a clockwise direction. This causes the link 144 to rotate in a clockwise direction so as to elevate the lifting mechanism 110. With the elevation of the lifting mechanism 110, the piece of lumber 54 moves upwardly onto the inclined ledge 116, by means of the V-belt 90, and the V-belt 90 also moves the piece of lumber 54 forwardly on the flat surface 114. The lug 118 may stop the forward movement of the piece of lumber 54. In some instances the lumber may not contact the lub 118 as the lumber may come to rest on the flat surface 114. In order to let the piece of lumber 54 pass, after it has been retarded, the plunger 130 is extended so as to rotate the lever 126 and the first link 124 in a counterclockwise direction. The second link 144 rotates in a counterclockwise direction so that the lifting mechanism 110 rotates forwardly and downwardly. This lowers the piece of lumber 54 onto the V-belt 90 and also lowers the lug 118 below the upper surface of the V-belt 90 so that the piece of lumber 54 passes over the lifting mechanism 110 and onto the conveyor.

The links 124 and 144 are important in the movement of the lifting mechanism 110 as with these links the lifting mechanism is elevated through a sine wave movement. From this it is appreciated that from a lowered rest position that the lifting mechanism upon being elevated accelerates rapidly from its lowered position and upon approaching its elevated position it decelerates so as to contact the piece of lumber 54 at a low velocity. By contacting the piece of lumber 54 at a low velocity the lifting mechanism does not mark the piece of lumber and in many instances the piece of lumber does not contact the lug 118.

From the foregoing it is seen that the lifting mechanism 110 gently contacts the piece of lumber 54. This action is in contrast to prior lumber retarders wherein the lifting mechanism contacted violently the piece of lumber so as to mark it and also, sometimes, to knock it off of the retarder.

In FIGURES 8 and 9 there is illustrated a chain for use with the lumber retarder in place of the V-belt 90 and the pulleys 87 and 88. In FIGURES 8 and 9 it is seen that on the shaft 56 there is a sprocket 150. A chain 152 runs around the sprocket 150 for carrying the lumber.

In FIGURES 10 and 11 it is seen that there is used a rope, such as a fiber rope or a steel rope, for carrying the lumber. On the shaft 56 there is a pulley 160. The rope 162 runs around the pulley 160 and carries the lumber forwardly on the lumber retarder.

In FIGURE 12 it is seen that there is a pulley 170 on the shaft 56. A flat belt 172 runs around the pulley 170.

One reason for using a belt or rope is that the belt and rope have a high coefficient of friction. When a piece of lumber 54 is deposited on the rope or belt the piece of lumber does not move or slide around due to this high coefficient of friction. Because of this it is not necessary to use lugs to move the lumber. Further, when the belt and rope are made from cloth and fibers and plastics the lumber is not marked.

Of course, it is to be realized that when a sprocket and chain are used on the lumber retarder mechanism that the pulley 44 is replaced with a sprocket. Likewise, when a rope 162 is used on the lumber retarder mechanism it may be desirable to replace the V-type pulley 44 with a pulley adaptable for a rope.

In FIGURES 1 and 2, it is seen that there is a control station for controlling the trimmer 22 and the retarder 24. In the particular installation in which this retarder is used, the control station comprises an electrical control which is sold under the trademark "Magnestat," a product of Republic Electric Development Company, Seattle, Wash. The electrical control used in this control station may be one of many. Some of the other controls may be a step register relay system, magnetic tape, punch tape and time delay relays. With a control unit it is possible for the operator to see the grade markings on the piece of lumber 50, set the control so that the trimmer 22 cuts the piece of lumber 50 into two pieces 52 and 54. Then, after these two pieces of lumber 52 and 54 have been formed and are on the outlet conveyor side of the trimmer 22 the operator can set the retarder mechanism so that the lifting mechanism 110 is raised to retard the flow of the lumber 54 so that both pieces of lumber 52 and 54 will not leave the retarder at the same time. Another way of operation is for the operator to notice the grade markings on the piece of lumber 50, set the trimmer saw and also the retarder so that upon the piece of lumber 50 being sawed into the two pieces of lumber 52 and 54 and upon leaving the outlet conveyor of the trimmer 22 that the retarder mechanism works to lift the lifting mechanism 110 to retard the flow of lumber 54. In other words, it is possible to simultaneously set the action of the trimmer 22 and the retarder 24. This means that the operator can selectively preset and predetermine which piece of lumber is to be retarded by the retarder 24. A third way is for the control to automatically actuate the retarder. The operator can actuate the trimmer. If the distance between any two saws is greater than a predetermined distance, viz, four feet or six feet, then the retarder is automatically actuated so that the lifting mechanism 110 is elevated to retard a piece of lumber. In the particular installation on which this invention is used, there is a waste disposal conveyor 180 below the retarder 24. In some instances a portion of the piece of lumber 50 has so many knots and is of such low grade that it has only scrap value. Then, that portion of the piece of lumber 50 is cut into short lengths and dropped through the retarder 24 onto the conveyor 180 to be removed from the primary system.

Further, the retarding of the piece of lumber 54 and then the release of the piece of lumber 54 must coincide with the movement of the endless chain 66 and lugs 69 of the conveyor 26 so that the piece of lumber 54, as well as the piece of lumber 52, are moved to the discharge end of the retarder 24 and to the infeed or intake end of the conveyor 26. With a piece of lumber in this position, the lugs 69 move the piece of lumber on the conveyor 26. It is seen that the movement of a piece of lumber on the trimmer 22, retarder 24, the release of a piece of lumber retarded by the lifting mechanism 110, and movement on the conveyor 26 is achieved by timed sequence. This is especially so in the relation between the retarder 24, the lifting mechanism 110 and the conveyor 26.

In FIGURE 1 it is seen that there are nine frame units or sets of frames 72 and 74. Of these nine units, five units have a retarding mechanism or lifting mechanism 110. In other words, the top four units, see FIGURE 1, do not have a retarding mechanism while the bottom five units do have a retarding mechanism. This means that a piece of lumber, such as 52, upon leaving the trimmer passes directly to the next conveyor while a piece of lumber, such as 54, is delayed or retarded so that only one piece of lumber at a time passes onto the next conveyor. It is to be realized that another retarder may have another number of frames such as seven or twelve or any reasonable number.

The design of the retarder 24 will vary with respect to the lengths of lumber being processed and with the use of the retarder 24. In this particular installation, the outside dimensions of the retarder 24 are approximately 27 feet. It can be seen that in some instances a retarder having smaller outside dimensions may be useful. The design and dimensions of the retarder 24, trimmer 22, feeder 20 and ending table 26 will vary from installation to installation. Further, the design of the retarder 24 will vary from use to use, such as: the conveyor on which the lumber is being received by the retarder and also the conveyor on which the retarder is depositing the lumber.

The production rate of this retarder is up to 110 pieces of lumber per minute. This high rate of production is possible because of the motion of the lifting mechanism 110, i.e., the sine wave motion and the short distance the mechanism has to lift the piece of lumber above the carrying means such as the V-belt 90, the rope 162 and the flat belt 172.

This retarder, in addition to being used for lumber, may be used for other items such as: flat stock, bar stock and channel members.

Having presented my invention, what I claim is:
1. A conveyor, said conveyor comprising:
   (a) a frame;
   (b) a first means to move an item;
   (c) a plurality of said frames in a substantially parallel relation for conveying an item at an angle transverse to the longitudinal axis of said frames;

(d) a first pulley;
(e) a second pulley;
(f) a flexible means running around said pulleys to convey an item;
(g) a first shaft adjacent to the entrance of the frame;
(h) a second shaft adjacent to the exit of the frame;
(i) said first pulley being on the first shaft;
(j) said second pulley being on the second shaft;
(k) a roller case comprising skate wheels adjacent the entrance to the frame;
(l) said skate wheels of said roller case near the entrance of the frame being above the flexible means; and
(m) said skate wheels near the center of the frame being below the flexible means.

2. A conveyor according to claim 1 and comprising:
(a) said roller case being attached to the frame; and
(b) said roller case being substantially parallel to the flexible means.

References Cited

UNITED STATES PATENTS

| | | | |
|---|---|---|---|
| 3,232,415 | 2/1966 | Gotham | 198—30 |
| 1,829,035 | 10/1931 | Besal | 198—34 |
| 2,065,205 | 12/1936 | Appleyard | 198—34 |
| 2,759,594 | 8/1956 | Kleboe | 198—190 |
| 3,109,882 | 11/1963 | Maltby | 198—34 |
| 3,080,042 | 3/1963 | Sherman | 198—34 |
| 3,081,863 | 3/1963 | Monohan | 198—34 |
| 3,096,871 | 7/1963 | Anderson | 198—34 |
| 3,289,818 | 12/1966 | Kittredge | 198—190 |
| 3,291,287 | 12/1966 | Rehm | 198—190 |

RICHARD E. AEGERTER, Primary Examiner

U.S. Cl. X.R.

198—34, 102